(12) United States Patent
Perlman

(10) Patent No.: US 8,908,526 B2
(45) Date of Patent: Dec. 9, 2014

(54) CONTROLLED INTERCONNECTION OF NETWORKS USING VIRTUAL NODES

(75) Inventor: Radia Perlman, Redmond, WA (US)

(73) Assignee: Intel Corporation, Santa Clara, CA (US)

( * ) Notice: Subject to any disclaimer, the term of this patent is extended or adjusted under 35 U.S.C. 154(b) by 632 days.

(21) Appl. No.: 12/889,309

(22) Filed: Sep. 23, 2010

(65) Prior Publication Data

US 2012/0076150 A1    Mar. 29, 2012

(51) Int. Cl.
| | |
|---|---|
| *H04L 12/28* | (2006.01) |
| *G06F 15/173* | (2006.01) |
| *H04L 12/721* | (2013.01) |
| *H04L 12/46* | (2006.01) |
| *H04L 12/751* | (2013.01) |
| *H04L 12/931* | (2013.01) |
| *H04L 12/24* | (2006.01) |
| *H04L 12/713* | (2013.01) |

(52) U.S. Cl.
CPC .............. *H04L 45/123* (2013.01); *H04L 45/12* (2013.01); *H04L 45/26* (2013.01); *H04L 45/02* (2013.01); *H04L 49/70* (2013.01); *H04L 41/12* (2013.01); *H04L 12/4641* (2013.01); *H04L 45/586* (2013.01)
USPC ........... 370/236; 370/238; 370/410; 370/426; 709/241; 709/242

(58) Field of Classification Search
None
See application file for complete search history.

(56) References Cited

U.S. PATENT DOCUMENTS

| | | | | | |
|---|---|---|---|---|---|
| 5,535,195 | A | * | 7/1996 | Lee ................................ | 370/256 |
| 6,628,649 | B1 | * | 9/2003 | Raj et al. ....................... | 370/360 |
| 8,139,492 | B1 | * | 3/2012 | Peterson et al. .............. | 370/238 |
| 2002/0156919 | A1 | * | 10/2002 | Maeno .......................... | 709/238 |
| 2003/0028670 | A1 | * | 2/2003 | Lee et al. ...................... | 709/241 |
| 2004/0081105 | A1 | * | 4/2004 | Shimazaki et al. ........... | 370/254 |
| 2004/0210892 | A1 | * | 10/2004 | Sharma ......................... | 717/168 |
| 2005/0047353 | A1 | * | 3/2005 | Hares ............................ | 370/255 |
| 2005/0163115 | A1 | * | 7/2005 | Dontu et al. .................. | 370/389 |
| 2005/0220077 | A1 | * | 10/2005 | Vereecke et al. .............. | 370/351 |
| 2008/0031266 | A1 | * | 2/2008 | Tallet et al. ................... | 370/401 |
| 2011/0134793 | A1 | * | 6/2011 | Elsen et al. ................... | 370/254 |
| 2011/0161489 | A1 | * | 6/2011 | Bhatt et al. ................... | 709/224 |
| 2011/0292933 | A1 | * | 12/2011 | Rodriguez Perez et al. .. | 370/389 |
| 2012/0008527 | A1 | * | 1/2012 | Le et al. ........................ | 370/254 |
| 2012/0072894 | A1 | * | 3/2012 | Wang et al. ................... | 717/168 |
| 2013/0114409 | A1 | * | 5/2013 | Iovanna et al. ................ | 370/235 |

OTHER PUBLICATIONS

J. Touch et al., "Transparent Interconnection of Lots of Links (TRILL): Problem and Applicability Statement," Network Working Group, May 2009, 18 pages.

* cited by examiner

*Primary Examiner* — Timothy J Weidner
(74) *Attorney, Agent, or Firm* — Schwabe, Williamson & Wyatt, P.C.

(57) ABSTRACT

Methods, apparatuses, and systems for controlling interconnections between nodes using virtual nodes are described. A physical node—such as a router, bridge, switch, etc.—stores a virtual cost associated with a virtual link that links virtual nodes of the physical node. A first physical port and a second physical port of the physical node are designated as belonging to a first virtual node and a third physical port of the physical node is designated as belonging to the second virtual node. The first physical port is associated with a first network partition and the second physical port is associated with a second network partition. The physical node transmits a routing information packet that includes the virtual cost.

20 Claims, 8 Drawing Sheets

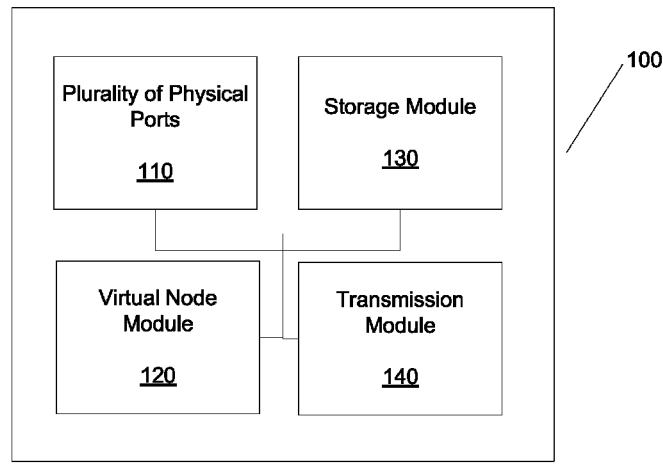
FIG. 1
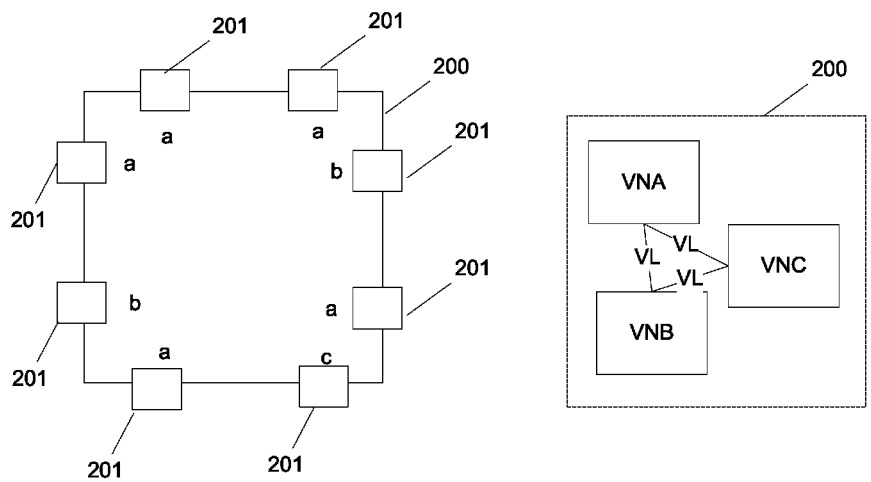
FIG. 2A
FIG. 2B

| LSP A1 |
| --- |
| E / 4 |
| D / 3 |
| A2 / 25 |

330

| LSP A2 |
| --- |
| B / 3 |
| C / 2 |
| A1 / 25 |

CONTROLLED INTERCONNECTION OF NETWORKS USING VIRTUAL NODES

TECHNICAL FIELD

The present disclosure generally relates to network interconnection, and in particular, to controlling the interconnection of networks using virtual nodes.

BACKGROUND

Unless otherwise indicated herein, the materials described in this section are not prior art to the claims in this application and are not admitted to be prior art by inclusion in this section.

Routers, switches, and other device are used for interconnection of networks. Routers will typically exchange routing information packets to share cost, link and/or destination information with one another. Each router then builds its own routing table and forwards packets to other nodes according to its routing table. Usually, the routes with the lowest costs are favored over other routes. In some instances, the costs of routes can be manipulated in order to engineer or control the traffic through the interconnected networks.

Virtual Local Area Networks (VLANs) are a way of tagging traffic within a LAN so that groups of nodes designated as belonging in one VLAN can share the same infrastructure (e.g., switches and links) with nodes belonging in other VLANs, but not be allowed to talk directly to nodes from the other VLANs.

Sometimes it might be desirable for multiple networks (e.g., network "partitions") to be merged into a single network, but VLAN tags in one partition do not necessarily have the same meaning as VLAN tags in other partitions. Rather than re-configuring all the VLAN numbers of nodes within one of the partitions, a technique may be used whereby the physical nodes that interconnect the partitions (known as the "cut set switches") perform VLAN mapping. VLAN mapping changes the VLAN number when forwarding traffic between the partitions. Sometimes for a particular VLAN within one of the partitions, a cut set switch might be configured to drop traffic tagged with a particular VLAN number, rather than forwarding it into a different partition.

VLAN mapping may be used in bridges, layer 2 switches, routers, and in routing bridges implementing Transparent Interconnect of Lots of Links (TRILL) —a draft standard within the Internet Engineering Task Force (see RFC 5556 "Transparent Interconnection of Lots of Links (TRILL): Problem and Applicability Statement" May 2009).

BRIEF DESCRIPTION OF THE DRAWINGS

Embodiments of the present disclosure will be described by way of exemplary illustrations, but not limitations, shown in the accompanying drawings in which like references denote similar elements, and in which:

FIG. 1 illustrates a block diagram of a physical node configured to control interconnections between networks according to various embodiments;

FIG. 2A illustrates a block diagram of a physical node having multiple physical ports grouped into port groupings according to embodiments;

FIG. 2B illustrates a depiction of a physical node having multiple virtual nodes according to embodiments;

FIG. 3C illustrates link state packets of a physical node having multiple virtual nodes according to embodiments;

DETAILED DESCRIPTION OF ILLUSTRATIVE EMBODIMENTS

Figure 2C:
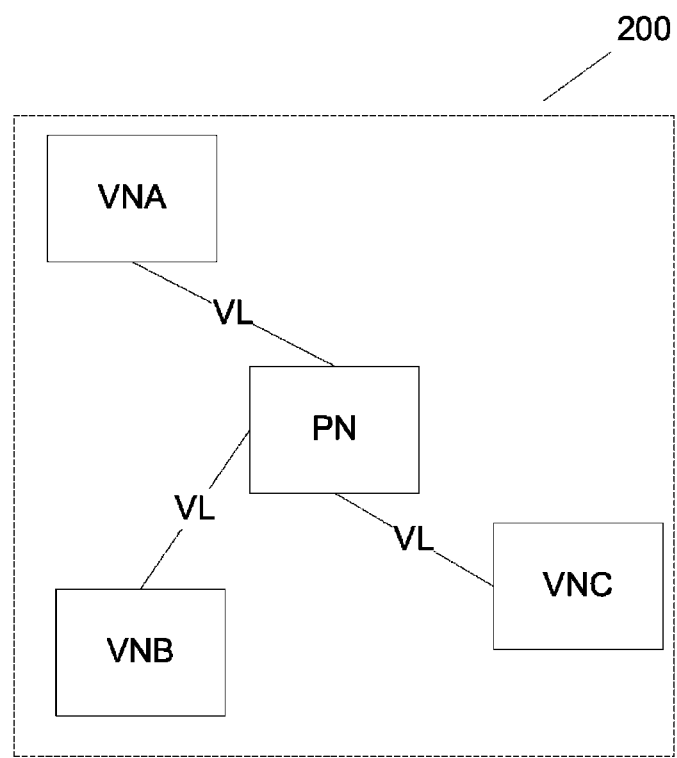
FIG. 2C illustrates a depiction of physical node 200 having multiple virtual nodes and a pseudonode according to embodiments.

In the following detailed description, reference is made to the accompanying drawings which form a part hereof, and in which are shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other, such as through a bridge or a repeater. Physical nodes may be "neighbors" even though they are separated by bridges or repeaters, and even if they communicate with each other wirelessly. Such neighbors are operatively coupled together.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present application include physical nodes (e.g., routers, bridges, switches, etc.) that are configured to implement virtual nodes and virtual links between the virtual nodes. The virtual links may have costs assigned to them. The physical nodes may have physical ports, and the physical nodes may be configured to associate a physical port with one of the virtual nodes. In an exemplary embodiment, physical ports associated with a first network partition may also be associated with a first virtual node, and physical ports associated with a second network partition may also be associated with a second virtual node. The physical node may be configured to transmit or broadcast routing information packets based at least in part on the virtual nodes, virtual links, and the costs assigned to the virtual links. In embodiments, the physical nodes may be configured to determine that virtual nodes should be implemented, such as when the physical node has ports associated with more than one network partition, where two or more of the physical ports are associated with the same network partition, and/or other considerations.

It may be undesirable for various reasons for packets to exit and re-enter a network partition. For example, problems may arise when a physical node has ports in multiple network partitions and VLAN mapping is employed. If a physical node is coupled to two or more network partitions, it may be possible for traffic to exit and re-enter one of the network partitions. But this may be undesirable for various reasons, such as for example when VLAN mapping is employed either with a null mapping or where VLAN mapping on the physical node is not one-to-one (where two or more VLANs in one network partition are mapped to a single VLAN in another network partition). In such cases, packets that are forwarded out of their originating network partition may be dropped, whereas if the path had stayed within the partition the packet could have been delivered. Configuring high costs to the links attached to the cut set node may result in sub-optimal paths through the network partition where the physical node has two or more ports belonging to the same network partition, and where the physical node would have been the best path for the intra-network partition traffic had its physical links not been programmed with an artificially high cost.

Physical nodes according to embodiments of the present invention may be configured to group ports according to the ports' associated network partitions, to associate each port group with a virtual node, and to implement virtual links between virtual nodes. Implementing virtual nodes on a physical node, and grouping ports according to their associated network partitions, may allow the physical node to present relatively high costs for routes through the physical node that exit a network partition, but to also present relatively low costs for routes through the physical node that stay within the same network partition. This may be accomplished by assigning a relatively high cost to the virtual links between virtual nodes. If the physical node employs link state routing (such as Open Shortest Path First (OSPF) or Intermediate System to Intermediate System (IS-IS)), the physical node may be configured to issue multiple link state packets (LSPs), one for each virtual node. In a physical node employing distance vector routing (such as Routing Information Protocol (RIP)), the physical node may add a relatively high cost when forwarding routing information out of a first physical port when the routing information was learned from a second physical port that is associated with a different virtual node than the first physical port. Similarly, physical nodes employing spanning tree protocol may also add a relatively high cost when forwarding routing information out of a first physical port when the routing information was learned from a second physical port that is part of a different virtual node than the first physical port. Examples that follow illustrate these and other embodiments of the present invention. It is also manifestly intended that embodiments of the present invention not be limited to link state and distance vector routing protocols or spanning tree protocols; various other routing protocols including hybrid protocols may also employ virtual nodes as described herein.

FIG. 1 illustrates a block diagram of a physical node configured to control interconnections between networks according to various embodiments. Physical node 100 may include plurality of physical ports 110. Plurality of physical ports 110 may be compatible with any number of physical layer protocols such as for example, but limited to, Electronics Industries Association (EIA) Recommended Standard 232 (RS-232), EIA Recommended Standard (RS-449), Telecommunication Standardization Sector (ITU-T) V.35 standard, ITU-T V.34 standard, ITU-T 1.430 standard, ITU-T 1.431 standard, Bell Labs Digital signal 1 (DS1), ITU-T E1 standard, voice grade telephone service (POTS), Synchronous Optical Networking (SONET), ITU-T Optical Transport Network (OTN), Digital Subscriber Line (DSL), any of various Institute of Electrical and Electronics Engineers (IEEE) 802.11x physical layer specifications, IEEE 802.15.x physical layer specification, ITU-T G.hn ("home network) physical layer specifications. Ethernet (such as for example as is standardized by IEEE 802.3), Universal Serial Bus (USB), Bluetooth or any of various Personal Area Networking (PAN) physical layer specifications, Token Ring, or others. Embodiments are not intended to be limited by any one type of types of physical layer protocols.

Physical node 100 may include virtual node module 120 configured to implement a plurality of virtual nodes such as a first virtual node and a second virtual node. Virtual node module 120 may be configured to implement virtual links having virtual costs—such as a virtual link linking the first virtual node and the second virtual node. Virtual node module 120 may be configured, for example, to designate a first physical port of a plurality of physical ports 110 as belonging to the first virtual node, and a second physical port of plurality of ports 110 as belonging to the second virtual node. Storage module 130 may be configured to store the virtual costs assigned to the virtual links implemented by virtual module 130. Storage module 130 may be configured to store other parameters such as information regarding the physical ports assigned to the virtual nodes, routing protocol information such as routing tables, forwarding tables, etc. Transmission module 140 may be configured to transmit, from one or more of the plurality of physical ports, a routing information packet including cost information that includes the virtual cost. Transmission module 140 may be configured to transmit the routing information packet from the first physical port, the second physical port, and/or a third physical port of the plurality of physical ports. The routing information packet may be, in embodiments, a LSP associated with the one of the virtual nodes (such as the first virtual node). Transmission module 140 may be configured to transmit a second LSP associated with another one of the virtual nodes (such as the second virtual node).

In embodiments, virtual node module 120 may be configured to implement a pseudonode as well as virtual links between the various virtual nodes and the pseudonode. For example, there may be a first virtual link between a first virtual node and the pseudonode, and a second virtual link between a second virtual node and the pseudonode. The first virtual link may have a first virtual cost and the second virtual link may have a second virtual cost different from the first virtual cost. In such embodiments, transmission module 140 may be configured to transmit a second LSP—such as an LSP for the pseudonode including the second virtual cost. A transmitted LSP for the pseudonode may include both the first virtual cost and the second virtual cost. In embodiments, transmission module 140 may be further configured to transmit, from the one or more of the plurality of physical ports, an LSP associated with the second virtual node.

In embodiments, the routing information packet may include destination information learned from one or more of plurality of physical ports 110. The routing information packet may associate the virtual cost with such destination information. Transmission module 140 may be configured to transmit routing information packets having information learned from a first physical port of plurality of physical ports 110 on a second physical port of plurality of physical ports 110. Transmission module 140 may be further configured to transmit the routing information packet from the second physical port. Transmission module 140 may be further configured to transmit a second routing information packet including second cost information and second destination information learned from the second physical port. The second routing information packet may associate the virtual cost with the second destination information, and transmission module 140 may be further configured to transmit the second routing information packet from the first physical port. Transmission module 140 may be further configured to transmit a third routing information packet including third cost information along with the first destination information and the second destination information. The third routing information packet may associate the virtual cost with the second destination information but not the first destination information, and the third routing information packet may be transmitted from a third physical port designated as belonging to the first virtual node.

Embodiments of physical node 100 may be configured to be compatible with conventional physical nodes. The routing information packets transmitted by transmission module 140 may be compatible with routing information packets that conventional physical nodes would be programmed to receive. For example, another physical node, upon receiving routing information packets from physical node 100, may not be aware that the virtual nodes implemented on physical node 100 are virtual, that physical node 100 exists as a stand-alone physical node, or that its virtual nodes are part of the same physical node.

Embodiments of virtual node module 120 may be configured to determine automatically when virtual nodes should be enabled. For example, if none of plurality of physical ports 110 are grouped together or associated with the same network partition, then there may be no need to implement virtual nodes. Also, if all physical ports are grouped into the same group, a virtual node may not be implemented. Or if inter-partition paths are not a problem, e.g., if VLAN mapping is not used, or if used, has all one-to-one mappings, then it may not be necessary or useful to enable virtual nodes. Embodiments of virtual node module 120 may be configured to enable virtual nodes upon a determination that there are two or more port groupings, that at least one port grouping has more than one physical port assigned to it and/or that there is at least one reason for inter-partition paths to be avoided, such as because VLAN mapping is enabled with a mapping scheme that is not one-to-one.

FIG. 2A illustrates a block diagram of a physical node having multiple physical ports grouped into port groupings according to embodiments. Physical node 200 may include one or more physical ports 201. Physical ports 201 may be grouped into groups a, b, and c. In embodiments, these groups may correspond to network partitions a, b, and c. In such embodiments, physical ports 201 grouped into group a may be associated with network partition a, physical ports 201 grouped into group b may have be associated with network partition b, and so forth.

FIG. 2B illustrates a depiction of physical node 200 having multiple virtual nodes according to embodiments. Physical node 200—which may correspond to physical node 200 in FIG. 2A—may have a virtual node module (not shown) configured to implement a plurality of virtual nodes, such as for example Virtual node a (VNA), Virtual node b (VNB), and Virtual node c (VNC). Physical ports 201 grouped into group a may be designated as belonging to VNA, and so forth. The virtual node module may be further configured to implement virtual links (VL) between the various virtual nodes, and such virtual links may have associated virtual costs. Physical node 200 may be configured to transmit, from one or more of the plurality of physical ports 201, a routing information packet including cost information, wherein the cost information includes one or more of the virtual costs as described elsewhere within this Detailed Description.

FIG. 2C illustrates a depiction of physical node 200 having multiple virtual nodes and a pseudonode according to embodiments. Physical node 200—which may correspond to physical node 200 in FIG. 2A—may have a virtual node module (not shown) configured to implement a plurality of virtual nodes, such as for example Virtual node a (VNA), Virtual node b (VNB), and Virtual node c (VNC). Physical ports 201 grouped into group a may be designated as belonging to VNA, and so forth. The virtual node module may be further configured to implement pseudonode PN which may be a virtual node not associated with any physical ports. In alternative embodiments, PN may be associated with one or more physical ports 201. PN may have associated virtual links (VL) between itself and the various virtual nodes (VNA, VNB, and VNC) in a hub-and-spoke configuration, and such virtual links may have associated virtual costs. Physical node 200 may be configured to transmit, from one or more of the plurality of physical ports 201, a routing information packet including cost information, wherein the cost information includes one or more virtual costs as described elsewhere within this Detailed Description.

Figure 3A:
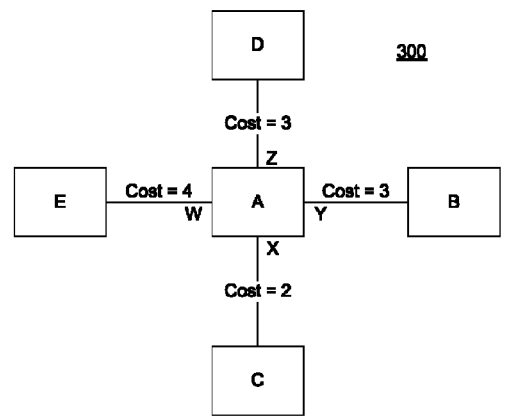
FIG. 3A illustrates a network having multiple physical nodes, with one of the physical nodes having multiple physical ports grouped into port groupings according to embodiments.

FIG. 3A illustrates a network having multiple physical nodes, with one of the physical nodes having multiple physical ports grouped into port groupings according to embodiments. Network 300 may include physical nodes A, B, C, D, and E.

Physical node A may include physical ports W, X, Y, and Z. In an exemplary embodiment, physical ports X and Y may be grouped together into group 2 and physical ports W and Z may be grouped together into group 1 (because, for example, physical ports X and Y may be associated with a second network partition and because, for example, physical ports W and Z may be associated with a first network partition). The physical link coupling physical nodes A and E may be set to have a cost of 4. The physical link coupling physical nodes A and D may be set to have a cost of 3. The physical link coupling physical nodes A and B may be set to have a cost of 3. And a physical link coupling physical nodes A and C may be set to have a cost of 2. Physical node A may have a virtual routing module configured to implement a plurality of virtual nodes.

Figure 3B:
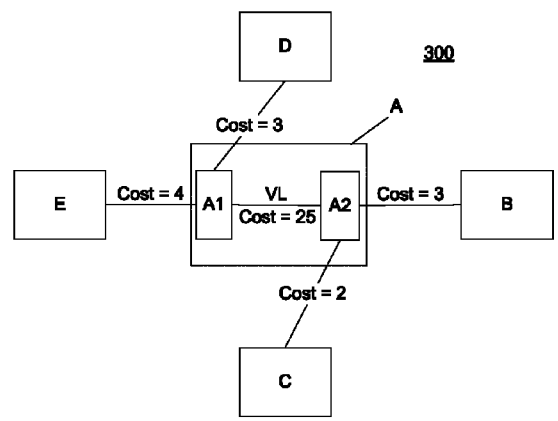
FIG. 3B illustrates a depiction of a network with a physical node having multiple virtual nodes according to further embodiments.

FIG. 3B illustrates a depiction of network 300 with physical node A having multiple virtual nodes according to further embodiments. Physical node A may have a virtual node module (not shown) configured to implement a plurality of virtual nodes, such as for example virtual nodes A1 and A2. The virtual node module may be configured to implement a virtual link VL between A1 and A2; VL may be set to have a virtual cost of 25. Physical node A may be configured to transmit routing information packets including the virtual cost of VL.

Figure 3C:
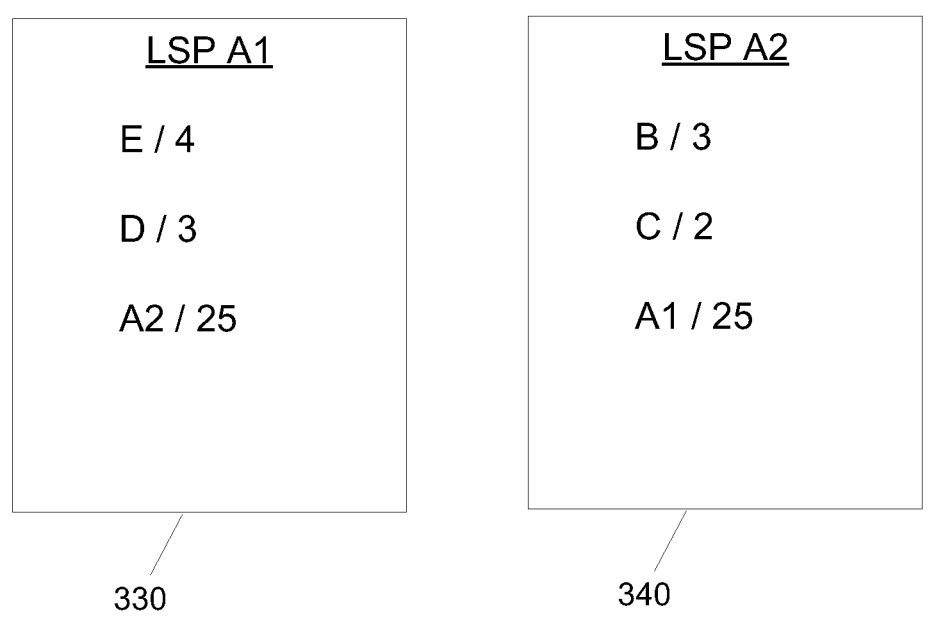

FIG. 3C illustrates link state packets of physical node 300 having multiple virtual nodes A1 and A2 according to embodiments. In conventional link state routing, a physical node may issue the same link state routing information packet from each of its physical ports. The conventional routing information packet would list all neighbors and costs to those neighbors. In a physical node implementing virtual nodes according to embodiments of the present invention, the physical node may issue a different link state routing information packet for each virtual node. A link state routing information packet according to embodiments may include both virtual links/costs as well as physical links/costs.

Routing information packet 330 may be a link state packet that corresponds to virtual node A1 (LSP A1). Routing information packet 330 may include cost information including a cost of 4 associated with the physical link to physical node E, a cost of 3 associated with the physical link to physical node D, and a virtual cost of 25 associated with the link to virtual node A2. Routing information packet 340 may be a link state packet that corresponds to virtual node A2 (LSP A2). Routing information packet 340 may include cost information including a cost of 3 associated with the physical link to physical node B, a cost of 2 associated with the physical link to physical node C, and a cost of 25 associated with the physical link to virtual node A1. Physical node 300 may be configured to transmit routing information packets 330 and 340 from all physical ports (W, X, Y, and Z).

Referring again to FIG. 3A, all physical nodes (A-E) may be configured to broadcast LSPs, receive all other nodes' LSPs, and build routing tables based on all nodes' LSPs. Physical node E, for example, may build a routing table that shows that a path to node D has a cost of 7 through physical node A (a cost of 4 between physical node E and virtual node A1 plus a cost of 3 from virtual node A1 to physical node D). In contrast, physical node E may build a routing table that shows that a path to node C has a cost of 31 through physical node A (a cost of 4 between physical node E and virtual node A1, a cost of 25 from virtual node A1 to virtual node A2, and a cost of 2 from virtual node A2 to physical node C.

Thus, in embodiments where port groupings on physical node A are based on associated network partitions, for example, virtual node A1 may allow physical node A to present relatively low costs for routes that do not exit a network partition (such as a route that passes from physical port W to physical port Z, and to also present relatively high-costs for routes that do exit a network partition (such as a route passing from physical port W to physical port Y or X). The result may be that other physical nodes within the network compute best—or lowest cost—routes that stay within a partition, unless routes that exit a network partition are the only routes available. In this way, physical node A may be used for intra-network partition traffic, but also allow physical node A to be avoided for inter-network partition traffic where both source and destination are in the same partition and an intra-partition path exists.

Figure 4A:
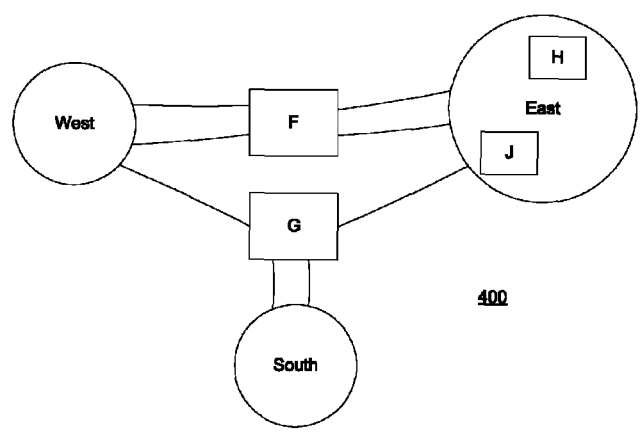
FIG. 4A illustrates a physical node according to an exemplary embodiment having physical ports grouped according to their associated network partitions.

FIG. 4A illustrates a physical node according to an exemplary embodiment having physical ports grouped according to their associated network partitions. Network 400 may include network partitions East, West, and South. Physical node F may include multiple physical links to network partitions East and West. Physical node G may include one or more physical links to network partitions East and West, and multiple physical links to network partition South. Physical nodes H and J may be within network partition East, and may have physical links only to other nodes within network partition East (such as for example each other, physical node F, physical node G, or other physical nodes not shown within East). Network partitions East, West, and South may have other physical nodes (not shown) that have physical links to other nodes within their respective network partitions.

In the exemplary embodiment shown in FIG. 4A, the physical ports on physical node F may be grouped according to their associated network partitions. For example, the physical ports with links to East may be grouped into one port grouping and the physical ports with links to West may be grouped into a second port grouping. The physical ports on physical node G may also be similarly grouped, though in embodiments the physical ports on physical node G may not need to be grouped in that way. Physical node F may have a virtual routing module configured to associate physical ports into various virtual nodes according to their port groupings, as shown in FIG. 4B.

Figure 4B:
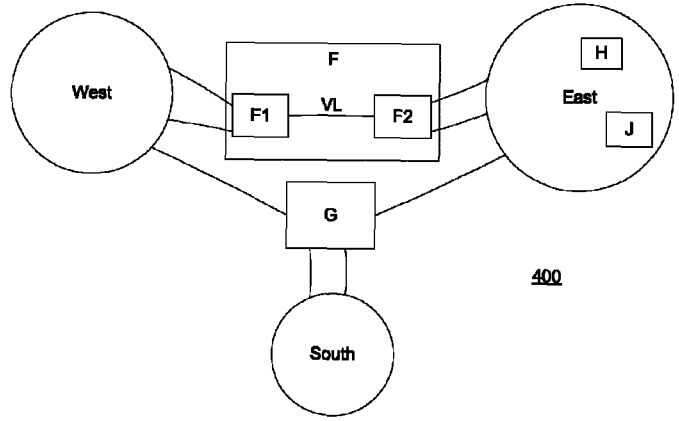
FIG. 4B illustrates a physical node according to a further exemplary embodiment having physical ports grouped according to their associated network partitions.

FIG. 4B illustrates a physical node according to a further exemplary embodiment having physical ports grouped according to their associated network partitions. A virtual routing module of physical node F may be configured to implement virtual nodes, and to associate virtual node F2 with the physical ports with links to East and virtual node F1 with physical ports with links to West. The virtual routing module may be configured to implement a virtual link VL between virtual nodes F1 and F2. VL may have an associated virtual cost which may be relatively high compared with the costs of the physical links associated with the physical ports of physical node F. Also, physical node F may be configured to transmit routing information packets that include costs associated with VL.

Physical node J, for example, may need to forward a packet to physical node H. Without the implementation of virtual nodes F1 and F2 within physical node F, it may be possible that the routing table in physical node J would show that the lowest cost to physical node H is to forward a packet out of East, to physical node F, into West, and back into East via physical node G. In other words, it may be possible that physical node J's lowest cost path to physical node H would cause physical node J to forward packets out of East. But this may be undesirable, such as when certain VLAN mapping implementations are used within network 400 as is described elsewhere within this Detailed Description.

Because physical node F may be configured to transmit routing information packets that include a relatively high cost across virtual link VL, a path from J to H that goes through virtual node F1 will have a relatively high cost. Thus, in this exemplary embodiment, implementing virtual nodes F1 and F2 on physical node F may allow physical node F to present relatively high cost routes to West. At the same time, F may present a relatively low cost route for traffic that stays within East. Thus, the virtual nodes on physical node F may allow physical node F to be used for traffic that stays within East and to prevent physical node F from forwarding traffic out of East, except when such a path is the only one available.

Figure 5:
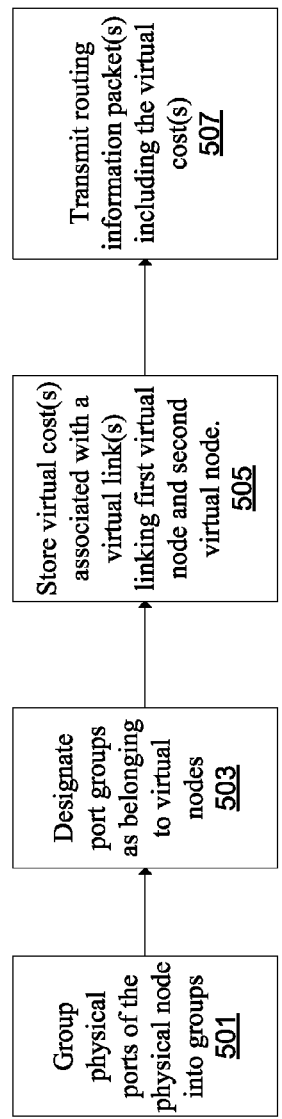
FIG. 5 illustrates a flow chart of a method of controlling interconnection between networks according to embodiments.

FIG. 5 illustrates a flow chart of a method of controlling interconnection between networks according to embodiments. A virtual node module of a physical node may group physical ports of the physical node into groups, block 501. Such port groups may in embodiments be based on network partition grouping; for example, physical ports associated with a particular network partition may be grouped together in a single port group. The port groups may be designated as belonging to virtual nodes, block 503. Virtual cost(s) associated with virtual link(s) linking the virtual nodes of the physical node may be stored, block 505. In embodiments utilizing a pseudonode, a first virtual cost associated with a first virtual link between a first virtual node and the pseudonode may be stored and a second virtual cost associated with a second virtual link linking the second virtual node and the pseudonode may also be stored, and so forth. Embodiments that do not utilize pseudonodes may store virtual costs associated with virtual links between two or more virtual nodes, such as between a first virtual node and a second virtual node.

Routing information packet(s) including cost information comprising the virtual cost(s) may be transmitted, block 507. The routing information packet may be transmitted, for example, out one or more of the physical ports to one or more other physical nodes. For example, the routing information packet may be transmitted out of a first physical port, a second physical port, a third physical port, and so forth. The third physical port may be designated as belonging to the first virtual node, the second virtual node, or a third virtual node. Embodiments are not limited to any number or numbers of virtual nodes that may be implemented.

One of the routing information packets may be a link state packet (LSP) associated with a first virtual node. A second routing information packet may be an LSP associated with a second virtual node. A third routing information packet may be an LSP associated with a third virtual node, and so forth.

In embodiments utilizing a pseudonode, routing information may be associated with the pseudonode and may include cost information with two or more virtual costs. In such embodiments, for example, a first routing information packet may be a link state packet associated with the first virtual node and it may include a first virtual cost of a virtual link linking the first virtual node and the pseudonode. A second routing information packet may be a link state packet associated with the second virtual node and it may include a second virtual cost of a virtual link linking the second virtual node and the pseudonode. A third routing information packet may be a link state packet associated with the pseudonode and it may include both the first and second virtual costs.

In embodiments utilizing a distance vector routing protocol, transmitted routing information packet(s) may include destination information and costs associated with the destination information. In one non-limiting example, a first destination may be learned on a first physical port of the physical node and a second destination may be learned on a second physical port of the physical node. A first routing information packet may associate the first destination information with a virtual cost of a virtual link between a first virtual node (associated with the first physical port) and a second virtual node (associated with the second physical port). Such first routing information packet may be transmitted from the second physical port. Likewise, a second routing information packet may associate the second destination information with the virtual cost of the virtual link. Such second routing information packet may be transmitted from the first physical port. In another aspect of the same non-limiting example, a third routing information packet including third cost information may be transmitted. The third routing information packet may include both the first destination information and the second destination information. The third routing information packet may associate the virtual cost with the second destination information but not the first destination information. In such embodiments, the third routing information packet may be transmitted from a third physical port designated as belonging to the first virtual node.

Figure 6:
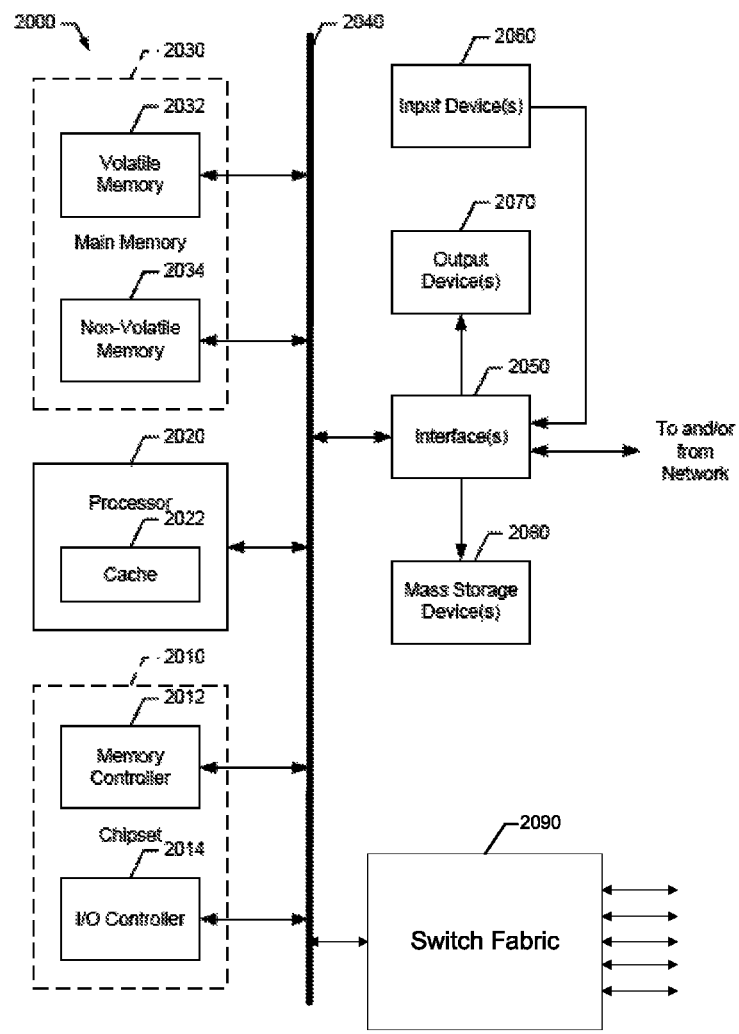
FIG. 6 is a block diagram of an example processor system adapted to implement the methods and apparatus disclosed herein.

FIG. 6 is a block diagram of an example processor system adapted to implement the methods and apparatus disclosed herein. The processor system 2000 illustrated in FIG. 6 may include a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, Wireless Personal Area Network (WPAN) components, Wireless Local Area Network (WLAN) components, Wireless Metropolitan Access Network (WMAN) components, Wireless Wide Area Network (WWAN) components, and/or other suitable processing components. For example, the processor 2020 may be implemented using one or more of the Intel® Core™ technology, Intel® Pentium® technology, the Intel® Itanium® technology, the Intel® Centrino™ technology, the Intel® Xeon™ technology, the Intel® XScale® technology, and/or Intel® ATOM™ technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device. Such non-transitory tangible computer-readable storage medium may include instructions stored thereon. The instructions may be configured to program the processor system, to enable the processor system, in response to execution of the instructions, to perform various operations described within this Detailed Description.

The processor system 2000 may also include an interface circuit 2050 that is coupled to the bus 2040. The interface circuit 2050 may be implemented using any type of interface standard such as an Ethernet interface, a universal serial bus (USB), a third generation input/output (2GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 may also be connected to the interface circuit 2050. For example, the output device(s)

2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives. Such non-transitory tangible computer-readable storage medium may include instructions stored thereon. The instructions may be configured to program the processor system, to enable the processor system, in response to execution of the instructions, to perform various operations described within this Detailed Description.

The interface circuit 2050 may also include one or more communication devices such as modems network interface cards to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

Switch fabric 2090 may control the routing of packets, frames, or other information in and out of various physical ports, as described elsewhere within this Detailed Description. Switch fabric 2090 may be configured to switch or route packets according to a routing table that may be stored within switch fabric 2090, main memory 2030, or some other component of processor system 2000.

While the components shown in FIG. 6 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Figure 7A:
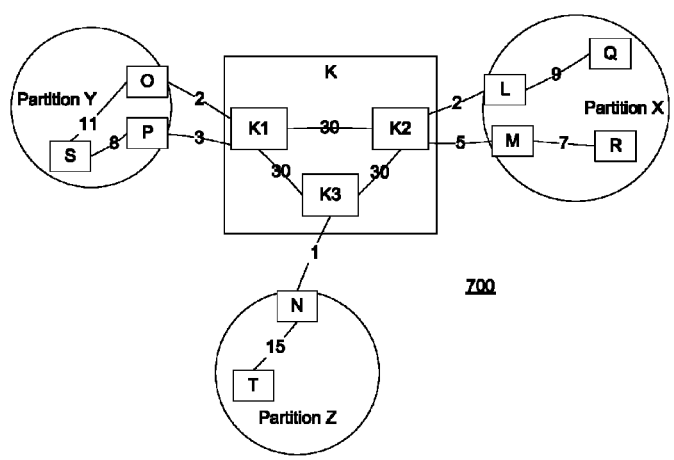
FIG. 7A illustrates a network employing a distance vector routing protocol according to various embodiments.

FIG. 7A illustrates a network employing a distance vector routing protocol according to various embodiments. Network 700 may include nodes K-T, and network 700 may be divided up into partitions, X, Y, and Z.

Partition Y may include physical nodes O and P, with physical links to node K (costs 2 and 3, respectively). Partition Y may also include physical node S, with a link to physical node O having a cost of 11, and a link to physical node P having a cost of 8. Partition X may include physical nodes L and M, each with physical links to physical node K (with costs of 2 and 5, respectively). Partition X may also include physical nodes Q and R. Physical node Q may have a physical link to physical node L having a cost of 9. Physical node R may have a physical link to M having a cost of 7. Partition Z may have physical node N with a physical link to physical node K having a cost of 1. Partition Z may also have physical node T with a physical link to physical node N having a cost of 15.

Physical node K may have a virtual node module configured to implement virtual nodes, such as virtual nodes K1, K2, and K3. The virtual node module may also be configured to implement virtual links between the virtual nodes; such virtual links are shown with cost of 30 in node K, but there is no requirement that each virtual link have the same virtual costs. As described elsewhere within this Detailed Description, the physical ports on physical node K may be grouped by the virtual node module according to the network partitions that the physical ports belong to, and to associate those port groupings with virtual nodes. Thus, virtual node K1 may be associated with a grouping of physical ports with links to partition Y, and so forth. The physical nodes in network 700 may employ distance vector routing.

Figure 7B:
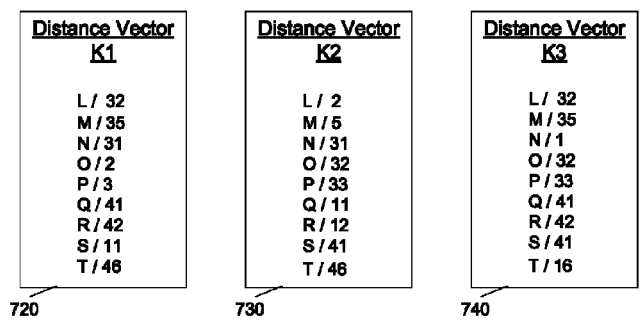
FIG. 7B illustrates distance vectors issued by a physical node having multiple virtual nodes according to embodiments.

FIG. 7B illustrates distance vectors issued by a physical node having multiple virtual nodes according to embodiments. In conventional distance vector routing, a physical node may issue or transmit the same distance vector to all neighbors. The conventional distance vector may include all destinations reachable through the physical node and the costs to those destinations. A physical node having a virtual routing module according to embodiments, such as physical node K in FIG. 7A, may issue different distance vectors to each of the network partitions.

Distance vector 720 may be transmitted to partition Y via the physical ports associated with virtual node K1, distance vector 730 may be transmitted to partition X via the physical ports associated with virtual node K2, and distance vector 740 may be transmitted to partition Z via the physical ports associated with virtual node K3. Each of distance vectors 720, 730, and 740 may include destinations and costs to each destination through physical node K. The costs associated with each destination may depend on whether the destination was learned from a physical port that is associated with the same partition as the physical port from which the costs are advertised. For example, distance vector 730 may include a cost to physical node Q of 11. But distance vectors 720 and 740 may include a cost of 41 to physical node Q.

Thus, physical node K may be configured to include a virtual cost when advertising destinations to network partitions other than the network partition from which the destination was learned in the first place. For example, physical node K may learn of physical node Q via one of the physical ports on physical node K associated with partition X (and associated with virtual node K2). Thus, when advertising a cost to Q to partition X from a physical port associated with virtual node K2, physical node K may not include the virtual cost of a virtual link. But when advertising a cost to Q to one of the other network partitions out of physical ports associated with virtual nodes K1 and K3, physical node K may include the virtual cost of a virtual link. Because the virtual costs may be relatively high compared with the costs associated with the physical links, physical node K may be used for traffic that stays within a network partition, but mostly avoided for traffic that exits a network partition where both source and destination are in the same partition and an intra-partition path exists.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A method, comprising:
associating, by a physical node, a plurality of physical ports on the physical node with one or more virtual nodes, wherein the physical ports are associated with one or more network partitions, and wherein the associating of a physical port to a virtual node is based, at least in part, upon the network partition to which the physical port is associated;
linking, by the physical node, a first virtual node of the one or more virtual nodes with a second node, with a virtual link;
storing, by the physical node, a virtual cost associated with the virtual link; and
transmitting, by the physical node, a routing information packet including cost information, wherein the cost information includes, at least, the virtual cost.

2. The method of claim 1, wherein the second node is a second virtual node of the one or more virtual nodes.

3. The method of claim 2, wherein the routing information packet is a link state packet (LSP) associated with the first virtual node, wherein the method further comprises transmitting a second routing information packet including second cost information, wherein the second cost information comprises the virtual cost, and wherein the second routing information packet is an LSP associated with the second virtual node.

4. The method of claim 2, wherein the routing information packet comprises first destination information learned from a first physical port associated with a first network partition and associated with the first virtual node, wherein the routing information packet associates the virtual cost with the first destination information, and wherein the routing information packet is transmitted from a second physical port associated with a second network partition and associated with the second virtual node.

5. The method of claim 4, further comprising transmitting a second routing information packet including second cost information, wherein the second routing information packet comprises second destination information learned from the second physical port, wherein the second routing information packet associates the virtual cost with the second destination information, and wherein the second routing information packet is transmitted from the first physical port.

6. The method of claim 5, further comprising transmitting a third routing information packet including third cost information, wherein the third routing information packet comprises the first destination information and the second destination information, wherein the third routing information packet associates the virtual cost with the second destination information but not the first destination information, and wherein the third routing information packet is transmitted from a third physical port associated with the first virtual node.

7. The method of claim 1, wherein the second node is a pseudonode and further comprising:
linking each virtual node of the one or more virtual nodes with the pseudonode via a pseudonode virtual link;
storing a virtual cost associated with each pseudonode virtual link; and
transmitting a second routing information packet for each pseudonode virtual link including the virtual cost of the respective pseudonode virtual link.

8. The method of claim 7, wherein the second routing information packet is a link state packet (LSP).

9. The method of claim 8, further comprising: transmitting a pseudonode routing information packet including virtual cost information associated with each virtual node linked to the pseudonode, and wherein the pseudonode routing information packet is a link state packet (LSP) associated with the pseudonode.

10. An apparatus, comprising:
a virtual node module operatively associated with a plurality of physical ports, the virtual node module to:
associate the plurality of physical ports with one or more virtual nodes, wherein the physical ports are associated with one or more network partitions, and wherein the association of a physical port to a virtual node is based, at least in part, upon the network partition to which the physical port is associated;
create a virtual link which links, at least, a first virtual node of the one or more virtual nodes with a second node; and
generate a virtual cost associated with the virtual link; and
a transmission module coupled with the physical ports, the transmission module to transmit, from one or more of the plurality of physical ports, a routing information packet including cost information, wherein the cost information includes, at least, the virtual cost.

11. The apparatus of claim 10, wherein the second node is a second virtual node of the one or more virtual nodes.

12. The apparatus of claim 11, wherein the routing information packet is a first link state packet (LSP) associated with the first virtual node, wherein the transmission module is further to transmit, from the one or more of the plurality of physical ports, a second routing information packet including second cost information, wherein the second cost information comprises the virtual cost, and wherein the second routing information packet is a second LSP associated with the second virtual node.

13. The apparatus of claim 11, wherein the routing information packet comprises first destination information learned from a first physical port associated with a first network partition and associated with the first virtual node, wherein the routing information packet associates the virtual cost with the first destination information, and wherein the transmission module is further to transmit the routing information packet from a second physical port associated with a second network partition and associated with the second virtual node.

14. The apparatus of claim 12, wherein the transmission module is further to transmit a second routing information packet including second cost information, wherein the second routing information packet comprises second destination information learned from the second physical port, wherein the second routing information packet associates the virtual cost with the second destination information, and wherein the transmission module is further to transmit the second routing information packet from the first physical port.

15. The apparatus of claim 14, wherein the transmission module is further to transmit a third routing information packet including third cost information, wherein the third routing information packet comprises the first destination information and the second destination information, wherein the third routing information packet associates the virtual cost with the second destination information but not the first destination information, and wherein the third routing information packet is transmitted from a third physical port associated with the first virtual node, and wherein the third physical port is also associated with the first network partition.

16. The apparatus of claim 10, wherein the second node is a pseudonode and the virtual node module is further to implement a second virtual link having a second virtual cost, wherein the second virtual link links a second virtual node of the one or more virtual nodes and the pseudonode, wherein the routing information packet is a first routing information packet and the transmission module is further to transmit a second routing information packet, from the one or more of the plurality of physical ports, including second cost information, wherein the second cost information includes the second virtual cost.

17. The apparatus of claim 16, wherein the first routing information packet is a first link state packet (LSP) associated with the first virtual node, and wherein the second routing information packet is a second LSP associated with the second virtual node.

18. The apparatus of claim 17, wherein the transmission module is further to transmit a pseudonode routing information packet, including virtual cost information associated with each virtual node linked to the pseudonode, from the one or more of the plurality of physical ports, wherein the pseudonode routing information packet is a link state packet (LSP) associated with the pseudonode.

19. An article of manufacture, comprising: a non-transitory tangible computer-readable storage medium having instructions embodied thereon, wherein the instructions, when executed by a processor, configure a physical node to:

enable virtual routing on the physical node based, at least in part, on the physical node containing a plurality of physical ports; wherein the physical ports are associated with one or more network partitions;

associate the physical ports with one or more virtual nodes, wherein association of a physical port to a virtual node is based, at least in part, on, the network partition to which the physical port is associated;

create a virtual link which links, at least, a first virtual node of the one or more virtual nodes with a second node;

store a virtual cost associated with the virtual link; and transmit a routing information packet from at least one of the plurality of physical ports, wherein the routing information packet includes cost information containing, at least, the virtual cost.

20. The article of claim 19, wherein the second node is a second virtual node of the one or more virtual nodes and said transmitting includes transmitting the routing information packet out of a first physical port, a second physical port, and a third physical port, wherein the first and second physical ports are associated with the first virtual node and a first network partition, and wherein the third physical port is associated with the second virtual node and associated with a second network partition.

* * * * *